US010981343B2

(12) United States Patent
Grolleman et al.

(10) Patent No.: US 10,981,343 B2
(45) Date of Patent: Apr. 20, 2021

(54) TRANSFER DEVICE AND METHOD FOR TRANSFERRING TIRE COMPONENTS FROM A CONTAINER TO A SERVICER

(71) Applicant: VMI HOLLAND B.V., Epe (NL)

(72) Inventors: Henk-Jan Grolleman, Epe (NL); Han Jonker, Epe (NL)

(73) Assignee: VMI HOLLAND B.V.

( * ) Notice: Subject to any disclaimer, the term of this patent is extended or adjusted under 35 U.S.C. 154(b) by 0 days.

(21) Appl. No.: 16/500,072

(22) PCT Filed: Apr. 9, 2018

(86) PCT No.: PCT/NL2018/050216
§ 371 (c)(1),
(2) Date: Oct. 1, 2019

(87) PCT Pub. No.: WO2018/190704
PCT Pub. Date: Oct. 18, 2018

(65) Prior Publication Data
US 2020/0189219 A1 Jun. 18, 2020

(30) Foreign Application Priority Data
Apr. 10, 2017 (NL) ...................................... 2018674

(51) Int. Cl.
*B29D 30/00* (2006.01)
*B65G 65/02* (2006.01)
(52) U.S. Cl.
CPC ......... *B29D 30/0016* (2013.01); *B65G 65/02* (2013.01); *B29D 2030/0038* (2013.01); *B65G 2201/0273* (2013.01)
(58) Field of Classification Search
CPC ........ B29D 30/0016; B29D 2030/0038; B65G 2201/0273
See application file for complete search history.

(56) References Cited

U.S. PATENT DOCUMENTS

| 3,901,392 A * | 8/1975 | Streckert ................ B65G 57/04 |
| | | 414/792.9 |
| 4,285,630 A * | 8/1981 | Manini ................... B29B 15/02 |
| | | 414/800 |

(Continued)

FOREIGN PATENT DOCUMENTS

| DE | 2846006 | 4/1980 | ............. B29D 30/00 |
| WO | WO9624252 | 8/1996 | ............... A21C 9/08 |

OTHER PUBLICATIONS

International Preliminary Report on Patentability issued in application No. PCT/NL2018/050216, dated Mar. 18, 2019 (16 pgs).

(Continued)

*Primary Examiner* — Kaitlin S Joerger
(74) *Attorney, Agent, or Firm* — Hayes Soloway P.C.

(57) ABSTRACT

Disclosed is a transfer device and a method for transferring a plurality of first tire components from a first container and a plurality of second tire components from a second container to a servicer, wherein the transfer device includes a first station and a second station for receiving the first container and the second container, respectively, wherein the first station and the second station are arranged side-by-side in a lateral direction, wherein the transfer device further includes a base and a take-out member that is mounted to said base and that is movable with respect to the base towards the first station and the second station for picking-up and taking-out one of the first tire components from the first container at the first station and for picking-up and taking-out one of the second tire components from the second container at the second station, respectively.

30 Claims, 12 Drawing Sheets

(56) References Cited

U.S. PATENT DOCUMENTS

| | | | | |
|---|---|---|---|---|
| 4,822,236 A | | 4/1989 | Inoue et al. ................. | 414/591 |
| 5,064,330 A | * | 11/1991 | Kumagai ........... | B29D 30/0016 |
| | | | | 198/463.3 |
| 5,368,678 A | * | 11/1994 | Miyamoto ......... | B29D 30/0016 |
| | | | | 156/405.1 |
| 5,911,846 A | | 6/1999 | Tatara et al. .................. | 156/123 |
| 6,761,527 B2 | * | 7/2004 | Eisenzimmer ..... | B29D 30/0016 |
| | | | | 294/65 |
| 6,857,844 B2 | * | 2/2005 | Eisenzimmer ..... | B29D 30/0016 |
| | | | | 414/728 |
| 9,776,367 B2 | * | 10/2017 | Grolleman ......... | B29D 30/0016 |
| 2019/0111644 A1 | * | 4/2019 | Pulici ..................... | B29C 31/08 |

OTHER PUBLICATIONS

International Search Report and Written Opinion issued in application No. PCT/NL2018/050216, dated Jun. 6, 2018 (11 pgs).

\* cited by examiner

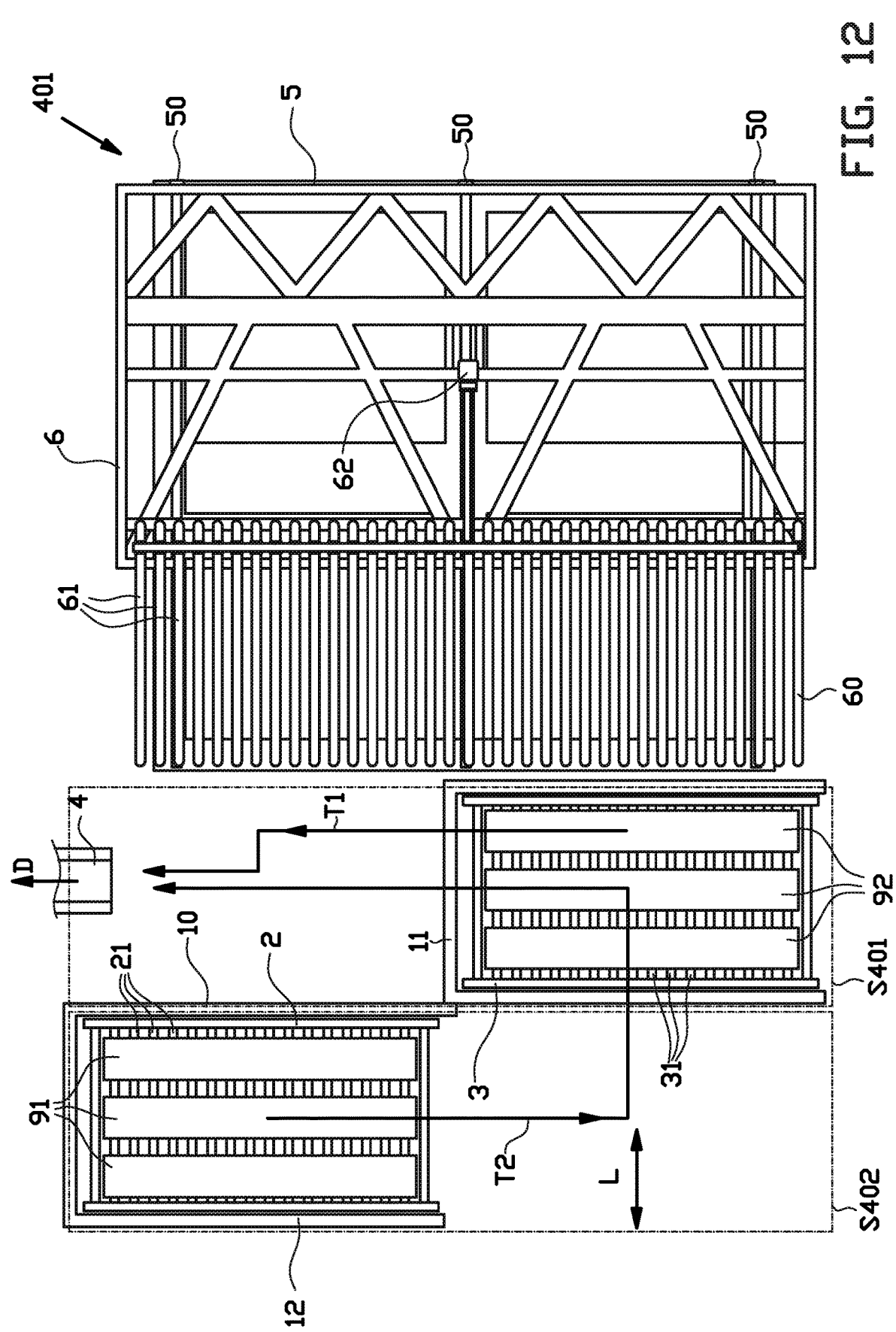

TRANSFER DEVICE AND METHOD FOR TRANSFERRING TIRE COMPONENTS FROM A CONTAINER TO A SERVICER

BACKGROUND

The invention relates to a transfer device and a method for transferring tire components from a container to a servicer.

U.S. Pat. No. 5,064,330 A discloses a belt-shaped member taking-out and transfer apparatus to take belt-shaped members one by one from a container having a plurality of shelves vertically stacked, and transferring them to a server of a tire building machine. The apparatus includes a lifter supporting thereon the container and intermittently raising and lowering the container. When the container is empty, the lifter lowers the container to a lower limit position. Thereafter, the empty container is removed from the lifter by means of a fork lift truck or the like and replaced by a full container.

During the exchange of the empty container for full container, the transfer of belt-shaped members to the server is temporarily interrupted and waiting for the operator to act. This significantly impacts the operating efficiency of the known belt-shaped taking-out and transfer apparatus, as well as any stations downstream of said apparatus.

It is an object of the present invention to provide a transfer device and a method for transferring tire components from a container to a servicer, wherein the efficiency of the transfer of tire components to the servicer can be improved.

SUMMARY OF THE INVENTION

According to a first aspect, the invention provides a transfer device for transferring a plurality of first tire components from a first container and a plurality of second tire components from a second container to a servicer, wherein the transfer device comprises a first station and a second station for receiving the first container and the second container, respectively, wherein the transfer device further comprises a base and a take-out member that is mounted to said base and that is movable with respect to said base in a lateral direction towards the first station and the second station for picking-up and taking-out one of the first tire components from the first container at said first station and for picking-up and taking-out one of the second tire components from the second container at said second station, respectively.

Hence, a single take-out member can be used to take-out the first tire components from the first container at the first station as well as the second tire components from the second container at the second station. The first container and the second container can be placed in their respective stations such that the second container is ready for interaction with the take-out member as soon as the first container has been emptied, and vice versa. Hence, the interruption when changing between containers can be reduced to a minimum and the efficiency of the transfer of tire components to the servicer can be improved.

Preferably, the first station and the second station are arranged side-by-side in the lateral direction. Hence, the take-out member can easily reach over the first station up to the second station for picking-up and taking-out the second tire components from the second container while the first container is exchanged.

In a preferred embodiment the base is located in the lateral direction at a side of the first station facing away from the second station, wherein the take-out member is arranged for reaching through the first station in the lateral direction up to the second station for picking-up and taking-out said one of the second tire components from the second container. The take-out member does therefore not need to be moved around the first station and can simply reach over the shortest possible distance through the first station towards the second station.

In a further embodiment the first station and the second station are provided with a first lift and a second lift, respectively, for raising or lowering the first container and the second container, respectively, with respect to the take-out member, wherein the first lift is arranged for lowering the first container into a first exchange position below the take-out member, wherein the take-out member is arranged for reaching over the first container in the first exchange position up to the second station for picking-up and taking-out said one of the second tire components from the second container. An emptied first container can thus be exchanged in the first exchange position by a 'new' filled first container while the take-out member interacts with the second container. Hence, the take-out of second tire components from the second container can be performed independently from and/or simultaneously with the exchange of the first container in the first exchange position.

In an embodiment thereof the take-out member is arranged to be spaced apart from the first container in the first exchange position when reaching over said first container. This can prevent unintended collisions between the take-out member and the first container when the first container is being exchanged in the first exchange position.

In a further embodiment the take-out member is arranged for transferring the first tire components and the second tire components to the servicer in a discharge direction transverse or perpendicular to said lateral direction. Hence, each station can be easily accessed in a direction parallel to said discharge direction without the other station blocking said access.

In an embodiment thereof the first station is arranged to be in line with the servicer in said discharge direction, wherein the take-out member is arranged for picking-up and taking-out said one of the first tire components from the first container in a first take-out direction parallel to the discharge direction. Hence, the first tire components can be transferred directly from the first container to the servicer.

In an alternative embodiment the first station and the second station are arranged out of line with the servicer in said discharge direction, wherein the take-out member is arranged for picking-up and taking-out said one of the tire components from the first container and the second container in a first take-out direction and a second take-out direction, respectively, parallel to the discharge direction and for moving said one taken-out tire component in the lateral direction into alignment with servicer in the discharge direction for transferring said one taken-out tire component to the servicer in said discharge direction. Hence, the tire components from the first container and the second container can be taken-out and aligned with the servicer in the same manner, regardless of the positioning of said servicer.

In an embodiment thereof the take-out member is arranged for picking-up and taking-out said one of the second tire components from the second container in a second take-out direction parallel to the discharge direction and for moving said one taken-out second tire component in the lateral direction into alignment with servicer in the discharge direction for transferring said one taken-out second tire component to the servicer in said discharge direction. This allows for alignment of said one taken-out second tire component with the servicer despite of the second station not being in alignment with the servicer.

In an embodiment thereof the take-out member is arranged for moving the one taken-out second tire component in the second take-out direction to a take-out position completely outside of the second container at the second station. Typically, the containers only allow for taking-out of the tire components in the respective transfer direction. Hence, by moving the one second tire component completely out of the second container, the one second tire component can be moved freely with respect to the second container in the lateral direction.

In one embodiment the second take-out direction is opposite to the first take-out direction, wherein the take-out member is arranged for transferring said one taken-out second tire component in the discharge direction to the servicer through the first station. The one taken-out second tire component is thus initially removed from the second container in the second take-out direction opposite to the first take-out direction, then moved laterally into alignment with the servicer and transferred through the first station in the discharge direction.

In an alternative embodiment the second take-out direction corresponds to the first take-out direction and/or the discharge direction. Hence, both the first tire components and the second tire components can be taken-out in the same discharge direction.

In a further embodiment the take-out member comprises a conveyor for conveying the first tire components and the second tire components in the first take-out direction and the second take-out direction. Said conveyor can effectively take-out the first tire components and the second tire components from their respective containers.

In an embodiment thereof the first container and the second container are each provided with a plurality of mutually parallel, spaced apart bars extending in the lateral direction in a number of superimposed, mutually parallel planes to form a series of shelves for supporting the first tire components and the second tire components, respectively, wherein the conveyor is a roller conveyor comprising a plurality of rollers extending in the lateral direction, wherein at least a first group of the rollers is arranged to be inserted between the plurality of bars of the first container or the second container for conveying the first tire components and the second tire components, respectively, over said plurality of bars in the first take-out direction and the second take-out direction. Each individual roller can be inserted between a pair of spaced apart bars to engage one of the tire components that is supported on said bars.

In an embodiment thereof, the first container and the second container are each provided by upright and/or vertically extending columns, wherein the plurality of bars are supported in their respective planes by said columns. The columns can reliably support the plurality of bars in the superimposed planes thereof. Moreover, the columns can prevent taking-out of the first tire components in the lateral direction.

In a further embodiment thereof, the shelves are fixed with respect to each other. Hence, the first container and the second container can be more robust.

In a further embodiment thereof at least some of the rollers are driven rollers. The rollers of the conveyor can thus effectively mobilize the tire components on a stationary set of bars.

In a further embodiment thereof the take-out member comprises a lateral drive that is arranged for moving the conveyor in the lateral direction with respect to the base towards and away from the first station and the second station. This allows for picking-up and taking-out tire components at different lateral positions within the first container and the second container and/or for bring the second tire components from the second container into alignment with the servicer in the aforementioned discharge direction.

In a further embodiment thereof a second group of the rollers is arranged to extend alongside the second container in the second take-out direction for conveying the one taken-out second tire component to a take-out position on the conveyor completely outside of the second container at the second station. Said second group of rollers can prevent that the one taken-out second tire component is unsupported when it has been taken-out from the second container.

According to a second aspect, the invention provides a method for transferring a plurality of first tire components from a first container and a plurality of second tire components from a second container to a servicer with the use of the transfer device according to any one of the aforementioned embodiments, wherein the method comprises the steps of:

a) receiving the first container and the second container in the first station and the second station, respectively;

b) moving the take-out member with respect to the base towards the first station for picking-up and taking-out one of the first tire components from the first container at said first station; and c) moving the take-out member with respect to the base towards the second station for picking-up and taking-out one of the second tire components from the second container at said second station.

The aforementioned method and the embodiments described hereafter relate to the practical implementation of the transfer device according to the first aspect of the invention. Hence, the method and its embodiments have the same technical advantages as the transfer device and its respective embodiments. Said technical advantages will not be repeated hereafter for reasons of conciseness.

In a preferred embodiment of the method the take-out member reaches through the first station in the lateral direction up to the second station in step c).

In a further embodiment the method further comprises the step of:

d) lowering the first container into a first exchange position below the take-out member prior to step c) such that the take-out member can reach over the first container in the first exchange position up to the second station.

In a further embodiment the method further comprises the step of:

e) transferring the first tire components and the second tire components to the servicer in a discharge direction transverse or perpendicular to said lateral direction.

In an embodiment thereof the first station is arranged in line with the servicer in said discharge direction, wherein the take-out member in step b) picks-up and takes-out said one of the first tire components from the first container in a first take-out direction parallel to the discharge direction.

In an embodiment the first station and the second station are arranged out of line with the servicer in said discharge direction, wherein the take-out member in step b) picks-up and takes-out said one of the tire components from the first container and the second container in a first take-out direction and a second take-out direction, respectively, parallel to the discharge direction and moves said one taken-out tire component in the lateral direction into alignment with servicer in the discharge direction for transferring said one taken-out tire component to the servicer in said discharge direction.

In an embodiment thereof step c) prior to step e) further comprises the steps of:

c1) picking-up and taking-out said one of the second tire components from the second container in a second take-out direction parallel to the discharge direction; and c2) moving said one taken-out second tire component in the lateral direction into alignment with servicer in the discharge direction.

In an embodiment thereof the one taken-out second tire component in step c1) is moved in the second take-out direction to a take-out position completely outside of the second container at the second station.

In a further embodiment thereof the second take-out direction is opposite to the first take-out direction, wherein said one taken-out second tire component in step e) is transferred in the discharge direction to the servicer through the first station.

In a further embodiment thereof the second take-out direction corresponds to the first take-out direction and/or the discharge direction.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of exemplary embodiments shown in the attached schematic drawings, in which:

FIGS. 9, 10, 11 and 12 show top views of alternative transfer devices according to a second embodiment, a third embodiment, a fourth embodiment and a fifth embodiment of the invention, respectively.

DETAILED DESCRIPTION OF THE INVENTION

Figure 1:
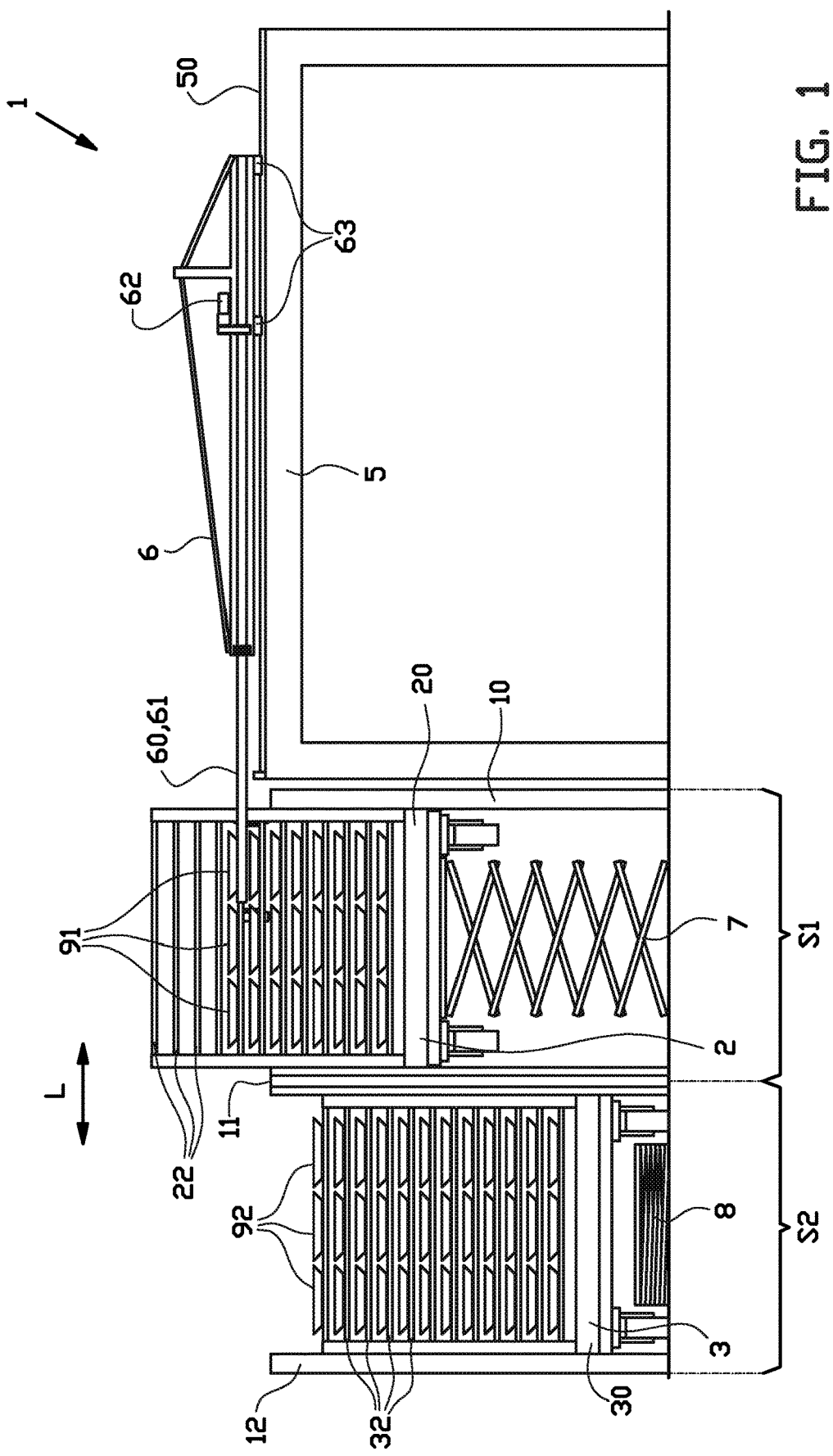
FIG. 1 shows a front view of a transfer device according to a first embodiment of the invention during the transfer of a plurality of first tire components from a first container to a servicer.

FIG. 1-8 show a transfer device 1 for transferring a plurality of first tire components 91 from a first container 2 and a plurality of second tire components 92 from a second container 3 to a servicer 4. In this exemplary embodiment, the tire components 91, 92 are tire treads. Alternatively, different tire components may be transferred.

As shown in FIG. 1, the transfer device 1 comprises a first station S1 and a second station S2 for receiving the first container 2 and the second container 3, respectively. The first station S1 and the second station S2 are located side-by-side in a lateral direction L. In this exemplary embodiment, the stations S1, S2 are defined in the lateral direction L by one or more separation walls 10-12 extending perpendicular to the lateral direction L. The separation walls 10-12 separate the first station S1 and the second station S2 from each other and may also function to guide the loading and/or unloading of the first container 2 and the second container 3 into and from the respective stations S1, S2.

Figure 6:
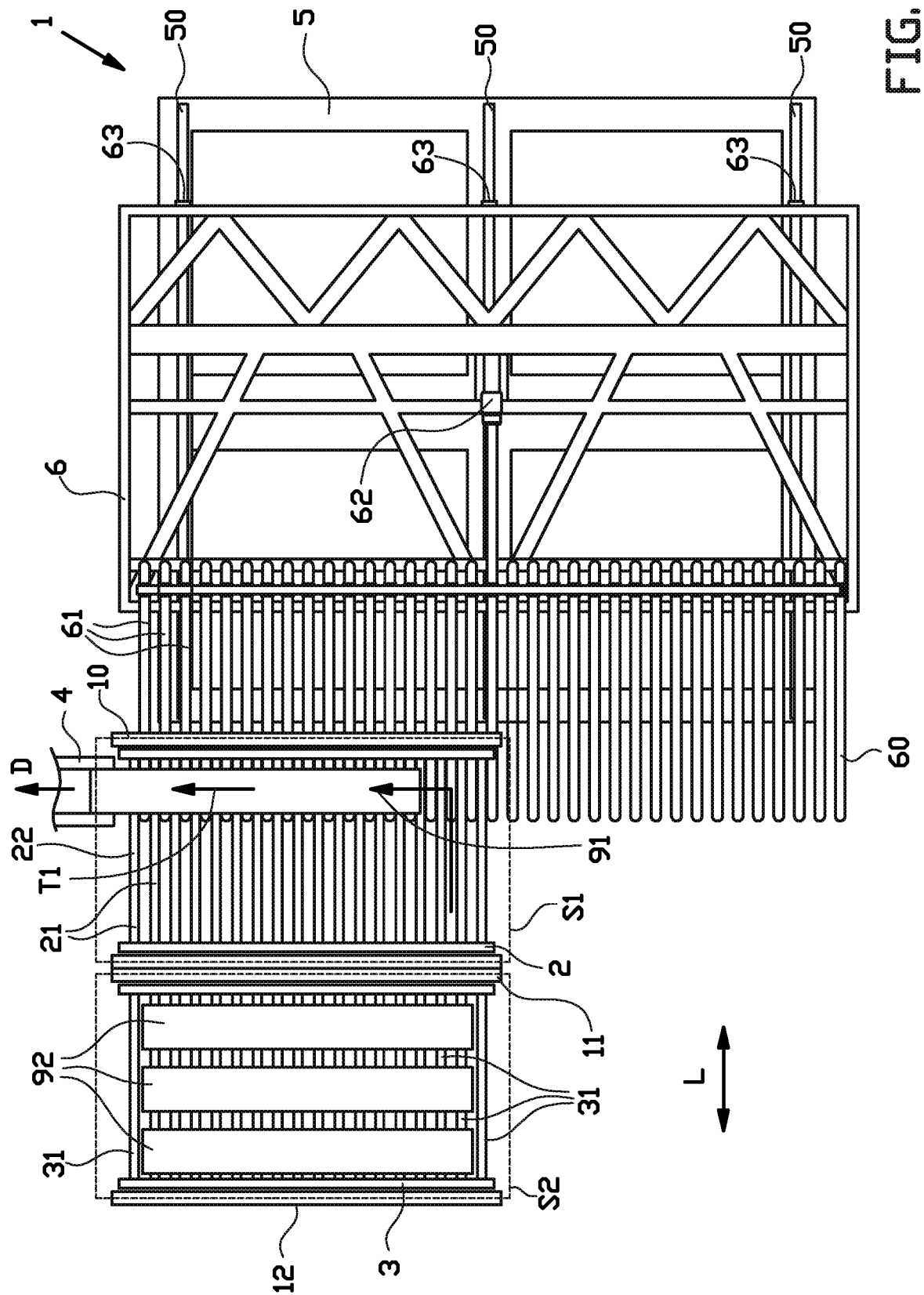

As shown in FIG. 1, the first container 2 comprises a carriage 20 for supporting the first container on the ground. Preferably, the carriage 20 comprises wheels for easy loading and unloading of the first container 2 into and from the first station S1. As best seen in FIG. 6, the first container 2 further comprises a plurality of mutually parallel, spaced apart bars 21 that—in the first station S1—extend in the lateral direction L in a number of superimposed, mutually parallel planes to form a series of shelves 22, as shown in FIG. 1, for supporting the first tire components 91. As shown in the side view of FIG. 3, the plurality of bars 21 are supported and/or fixed in their respective planes by upright and/or vertically extending columns 23. In this particular embodiment, the shelves 22 are fixed with respect to each other. The first carriage 20 is open in a direction perpendicular to its bars 21. The columns 23 prevent taking-out of the first tire components 91 in a direction parallel to the bars 21. In this exemplary embodiment, three of the first tire components 91 are supported side-by-side in the lateral direction L on each of the shelves 22.

Similarly, the second container 3 also comprises a carriage 30, preferably with wheels, a plurality of mutually parallel, spaced apart bars 31 that—in the second station S2—extend in the lateral direction L in a number of superimposed, mutually parallel planes to form a series of shelves 32 for supporting the second tire components 92 and upright and/or vertically extending columns 33 for supporting the plurality of bars 31 in their respective planes. Preferably, the first container 2 and the second container 3 are identical or substantially identical, at least in terms of functionality.

Figure 2:
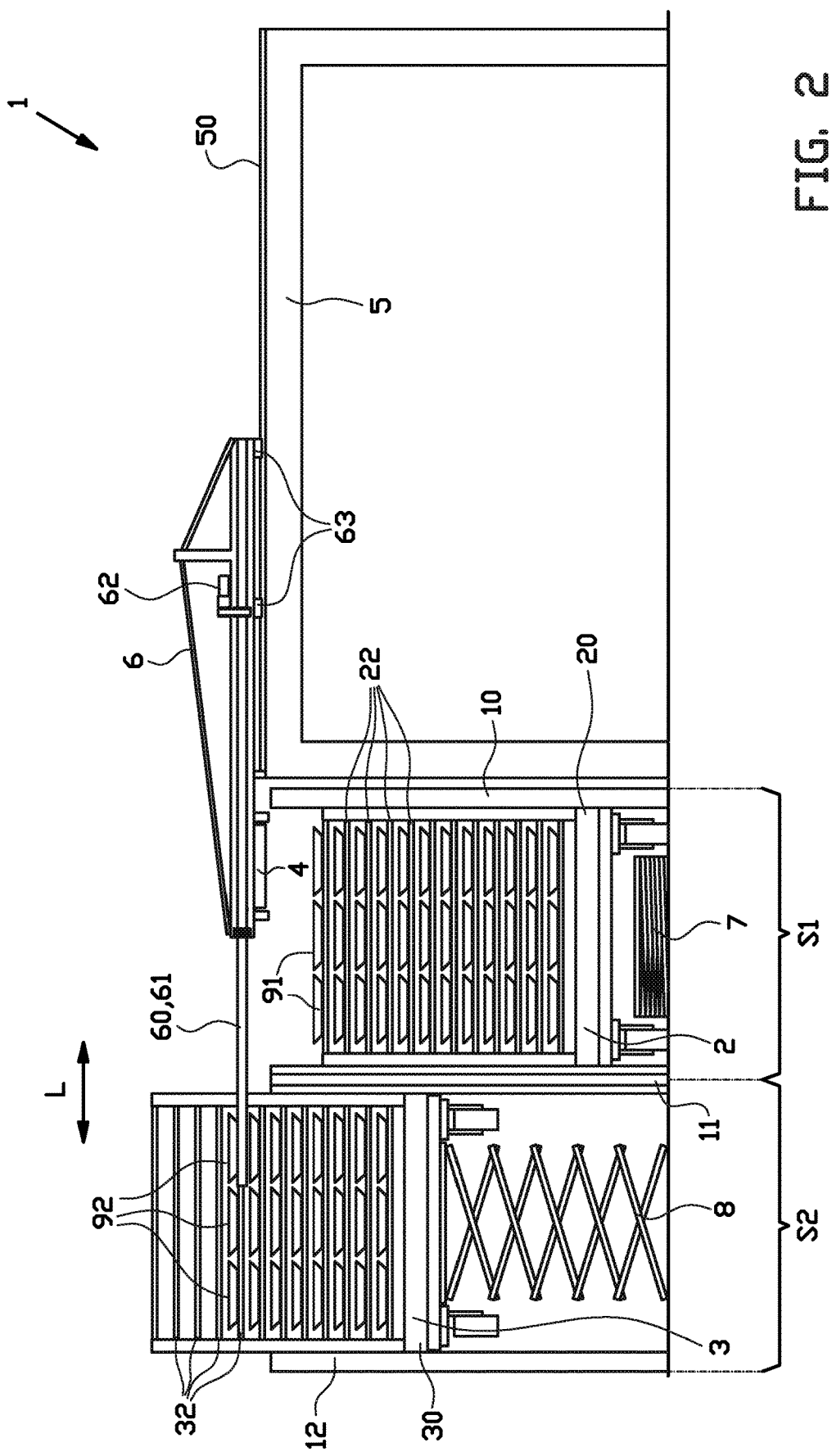
FIG. 2 shows a front view of the transfer device according to FIG. 1 during the transfer of a plurality of second tire components from a second container to the servicer.
Figure 3:
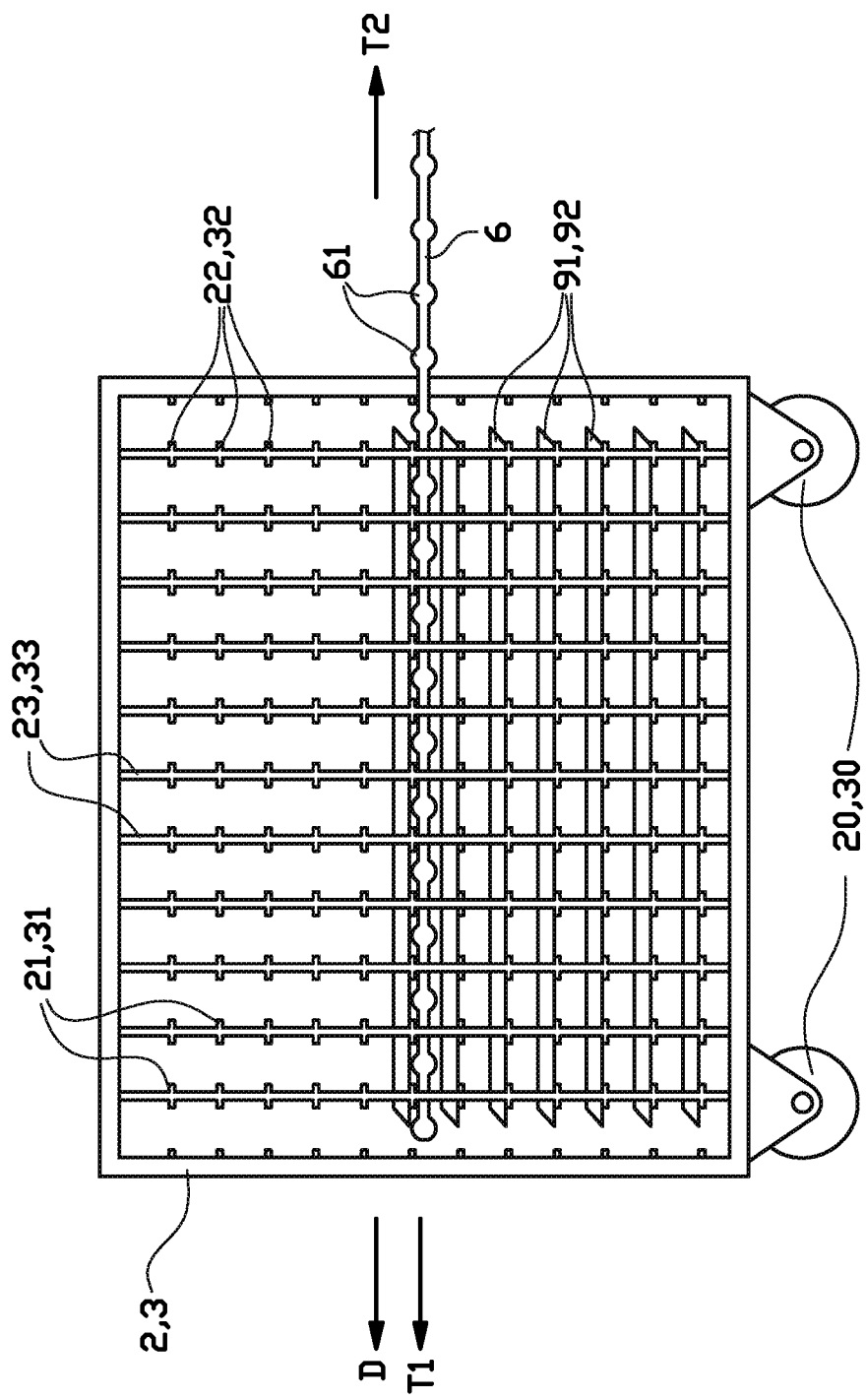
FIG. 3 shows a side view of the first container and the second container according to FIGS. 1 and 2.
Figure 7:
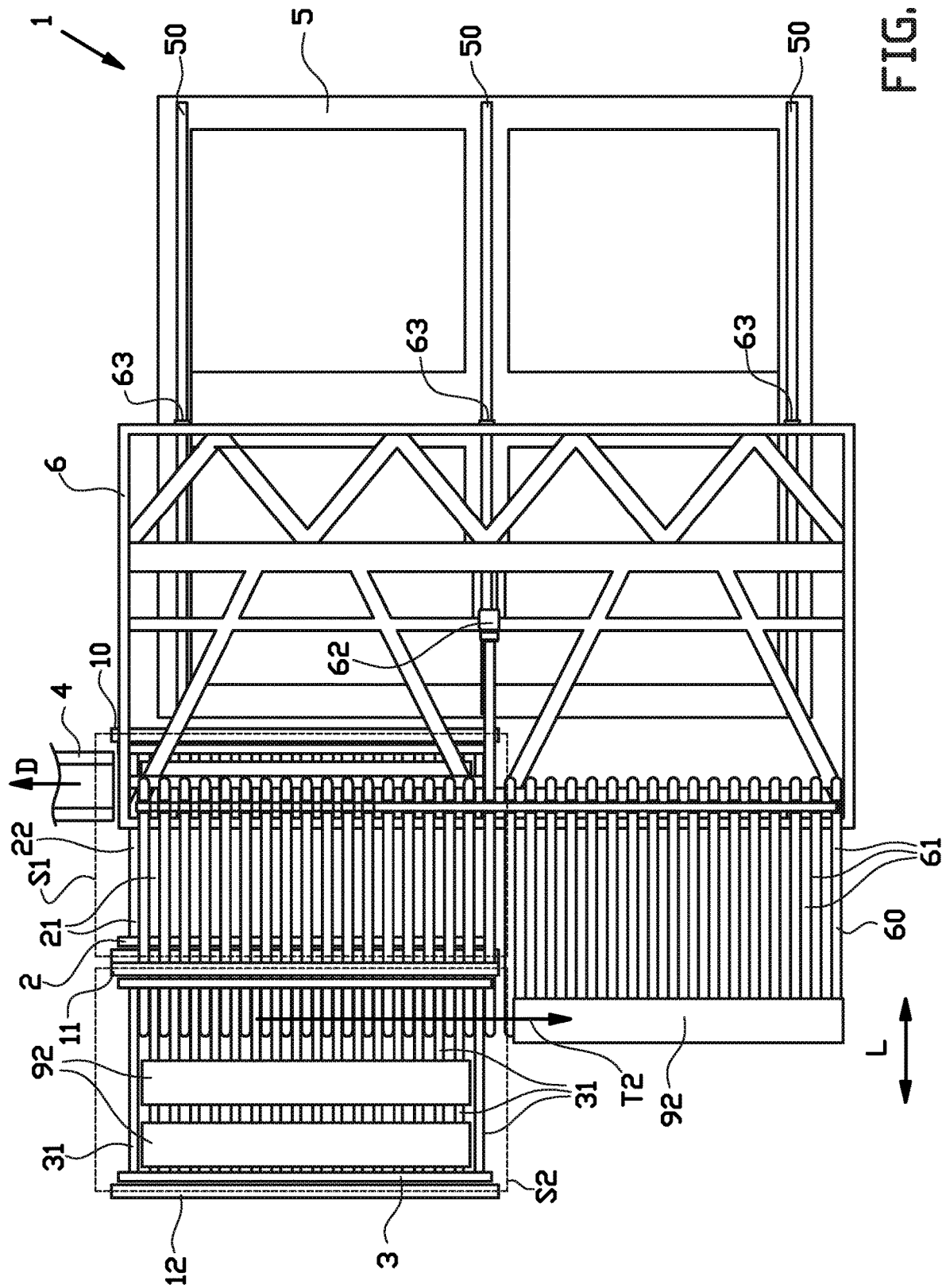
FIGS. 7 and 8 show top views of the transfer device according to FIG. 2 during the steps of transferring a plurality of the second tire components from the second container to the servicer.
Figure 8:
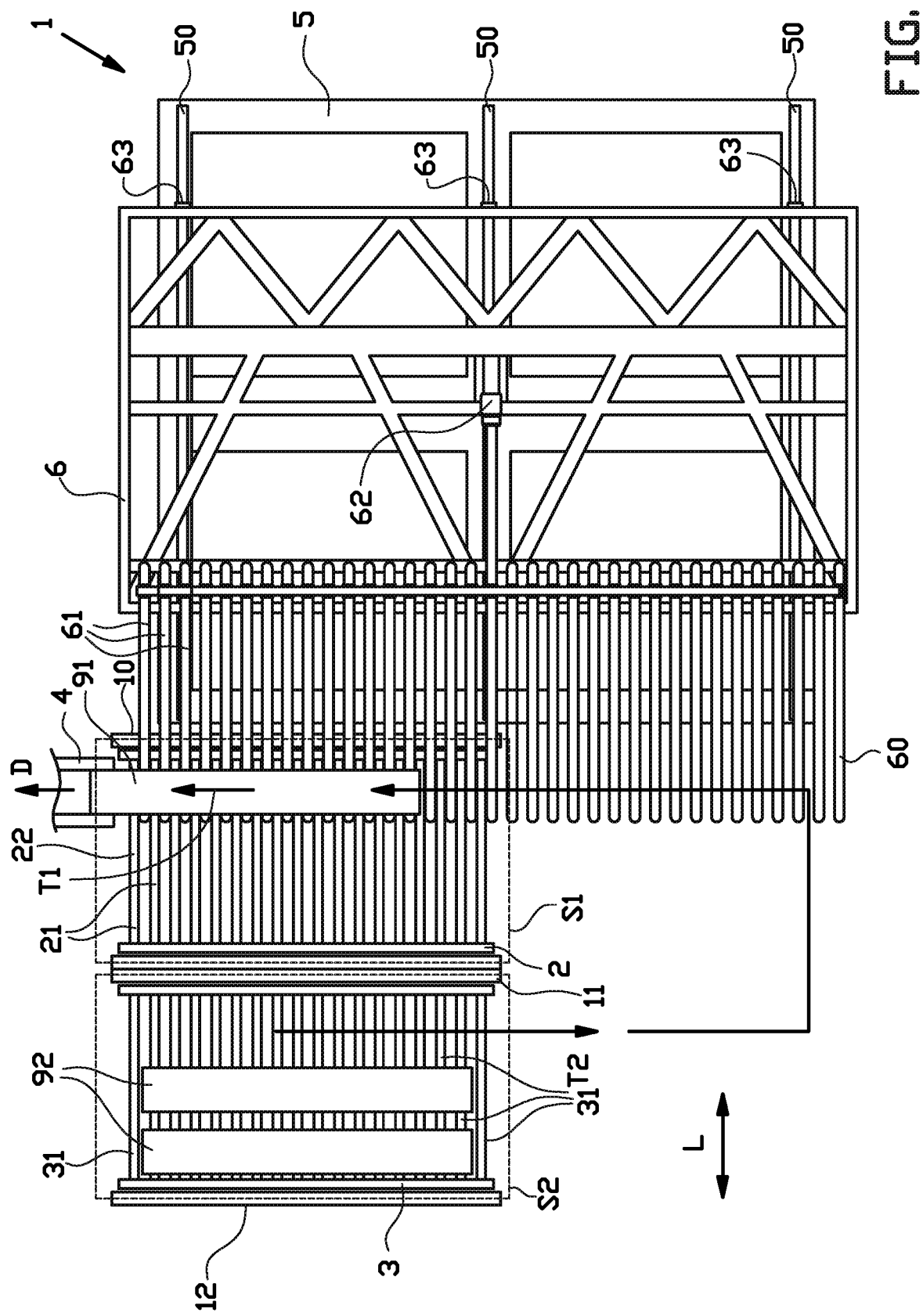

As shown in FIG. 1, the transfer device 1 further comprises a base 5 and a take-out member 6 that is mounted to said base 5. The base 5 is located in the lateral direction L at a side of the first station S1 facing away from the second station S2. The take-out member 6 is movable with respect to the base 5 towards the first station S1 for picking-up and taking-out one of the first tire components 91 from the first container 2 at said first station S1, as shown in FIGS. 1 and 4-6. The take-out member 6 is also movable with respect to the same base 5 towards the second station S2 for picking-up and taking-out one of the second tire components 92 from the second container 3 at said second station S2, as shown in FIGS. 2, 7 and 8. In particular, the range of the movability of the take-out member 6 is such that the take-out member 6 can reach up to and into the second container 3 at the second station S2, preferably up to the furthest second tire component 92 supported on said second container 3.

Figure 4:
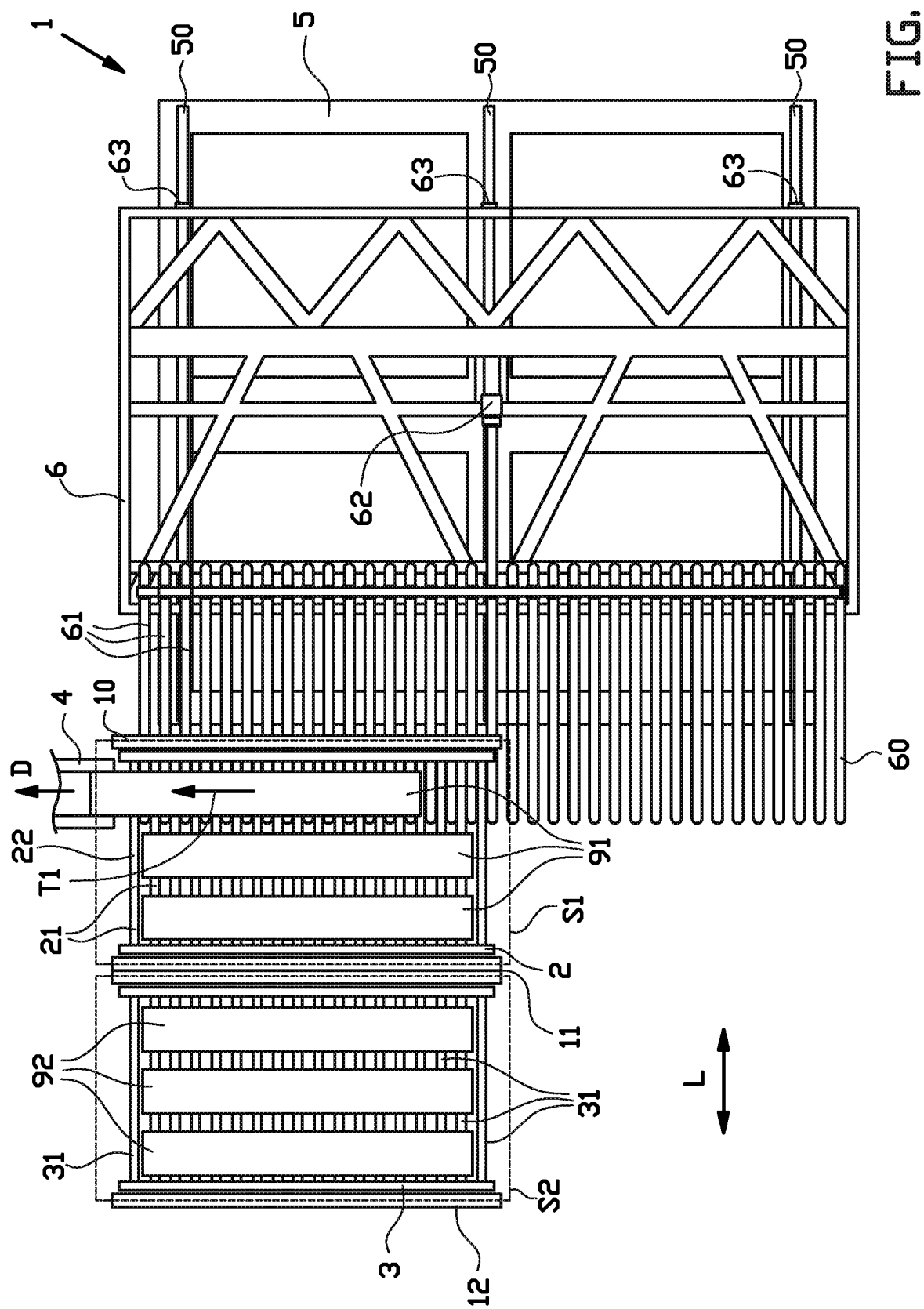
FIGS. 4-6 show top views of the transfer device according to FIG. 1 during the steps of transferring a plurality of the first tire components from the first container to the servicer.
Figure 5:
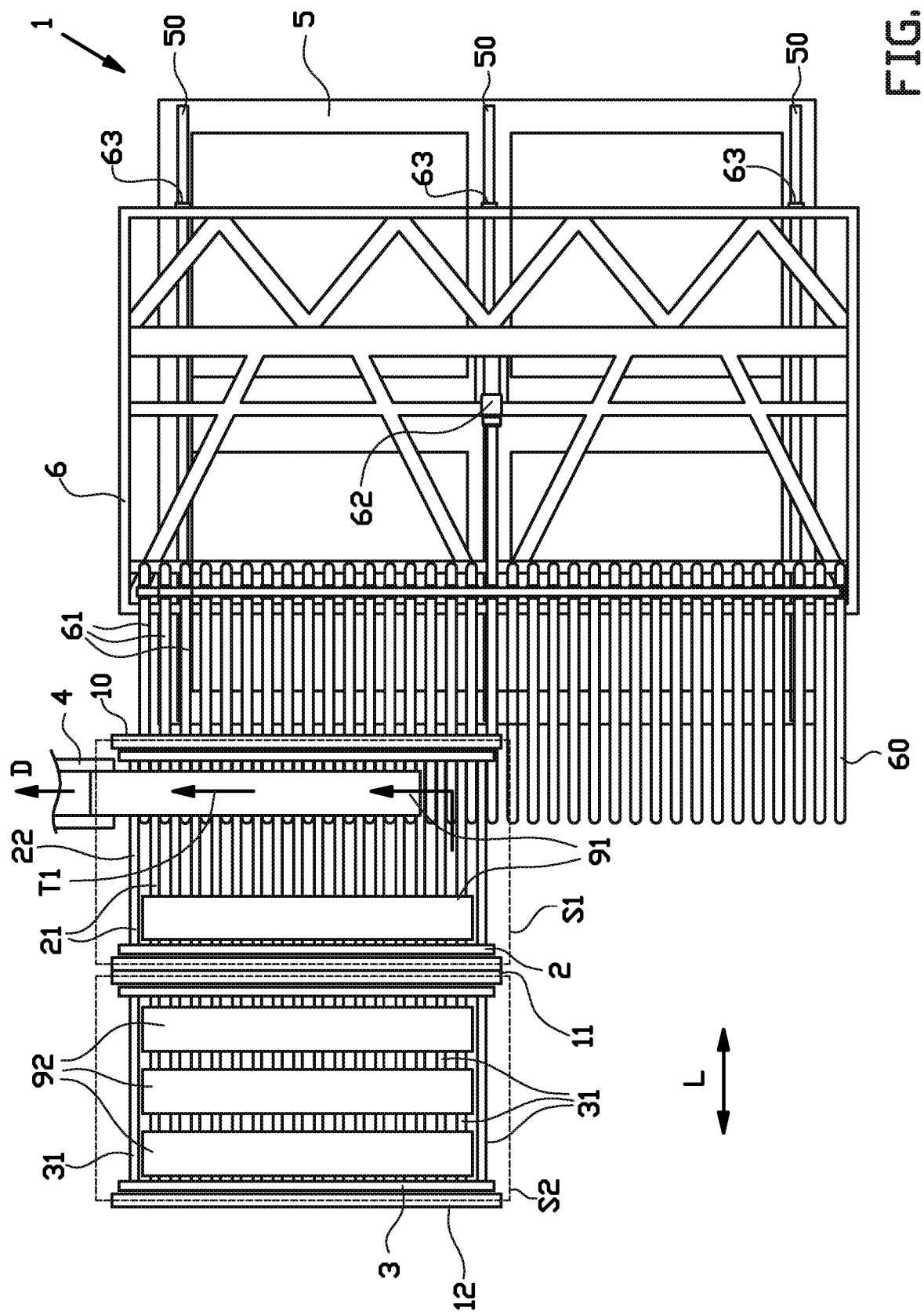

As shown in FIGS. 4-6, the servicer 4 is arranged for discharging the taken-out tire components 91, to a downstream tire building line (not shown) in a discharge direction D transverse or perpendicular to the lateral direction L. As shown in FIGS. 4-6, the first station S1 is aligned with the servicer 4 in the discharge direction D. The take-out member 6 is arranged for picking-up and taking-out the first tire components 91 from the first container 2 at the first station S1 in a first take-out direction T1 parallel to and in the same direction as the discharge direction D of the servicer 4. Consequently, the first tire components 91 can be transferred from the first container 2 directly onto the servicer 4. However, the second container 3 at the second station S2 is not in alignment, i.e. out of alignment, with the servicer 4 in the discharge direction D, as shown in FIGS. 7 and 8. Moreover, in this exemplary embodiment, the take-out member 6 is arranged for picking-up and taking-out the second tire components 92 in a second take-out direction T2 opposite to the first take-out direction T1 and/or the discharge direction D. Once taken-out, the take-out member 6 is arranged for moving the second tire components 92 in the lateral direction L into alignment with servicer 4 in the discharge direction D. The second tire components 92 can subsequently be transferred through the first station S1 to the servicer 4 in said discharge direction D.

As best seen in FIGS. 4-8, the take-out member comprises a conveyor 60 for conveying the first tire components 91 in the first take-out direction T1 at the first station S1 and the second tire components 92 in the second take-out direction T2 at the second station S2. In particular, the conveyor 60 is a roller conveyor 60 comprising a plurality of rollers 61 extending in the lateral direction L. The rollers 61 are dimensioned to fit between a pair of spaced apart bars 21, 31 of the containers 2, 3. When inserted between the bars 21, 31, the rollers 61 are arranged to extend slightly above the shelf 22, 32 defined by said bars 21, 31 to engage the tire components 91, 92 supported on said shelf 22, 32. Preferably, at least some of the rollers 61 are driven rollers 61, i.e. driven by the roller drive 62 as schematically shown in FIGS. 1 and 2. Said roller drive 62 drives one of the rollers 61, which in turn is connected via a transmission to and drives all of the other rollers 61. The driven rollers 61 are arranged for conveying and/or rolling out the engaged tire component 91, 92.

As shown in FIGS. 4-8, a first group of the rollers 61 is arranged to be inserted between the plurality of bars 21, 31 of the first container 2 or the second container 3. A second group of the rollers 61 is arranged to extend alongside the second container 3 in the second take-out direction T2 for conveying the one taken-out second tire component 92 to a take-out position onto the conveyor 60, as shown in FIG. 7, completely outside of the second container 3 at the second station S2. The conveyor 60 can subsequently be moved in the lateral direction L to align the one taken-out second tire component 92 into alignment with the servicer 4 in the discharge direction D.

The take-out member 6 further comprises a lateral drive 63 for moving the conveyor 60 with respect to the base 5 in the lateral direction L. In this exemplary embodiment, the lateral drive 63 is formed by a linear motor that engages onto one or more guides 50 extending in the lateral direction L on the base 5.

As shown in FIGS. 1 and 2, the first station S1 and the second station S2 are provided with a first lift 7 and a second lift 8, respectively, for raising or lowering the first container 2 and the second container 3, respectively, with respect to the take-out member 6. In FIG. 1, the first lift 7 has been operated to lift the first container 2 up to a raised position at which the take-out member 6 can interact with the first container 2. The second lift 8 has meanwhile been lowered to a lowered position in which the second container 3 is completely below the take-out member 6. In contrast, in FIG. 2, the first lift 7 has been operated to lower the first container 2 to a lowered position in which the first container 2 is completely below the take-out member 6. Meanwhile, the second lift 8 has been operated to raise the second container 3 to a raised position at which the take-out member 6 can interact with the second container 3.

In FIG. 2, the first container 2 is lowered into a first exchange position that allows for loading and/or unloading of the first container 2 to and from the first station S1. When the first container 2 is in said first exchange position, the take-out member 6 is arranged to reach or extend over the first container 2 in said first exchange position. In particular, the take-out member 6 and the first container 2 are spaced apart and/or clear from each other, so that the loading and/or unloading of the first container 2 can be performed independently from and/or simultaneously with the taking-out of the second tire components 92 from the second container 3.

Similarly, in FIG. 1, the second container 3 is lowered into a second exchange position that allows for loading and/or unloading of the second container 3 to and from the second station S2 independently from and/or simultaneously with the taking-out of the first tire components 91 from the first container 2.

A method for transferring one or more first tire components 91 from the first container 2 and one or more second tire components 92 from the second container 3 to the servicer 4 with the use of the aforementioned transfer device 1 will be described hereafter with reference to FIGS. 1-8.

FIGS. 1 and 4 show a first step of the method in which a first container 2 and a second container 3 are received in the first station S1 and the second station S2, respectively. Preferably, the containers 2, 3 are secured in position onto their respective lifts 7, 8 so that the positioning of the containers 2, 3, and in particular the bars 21, 31 thereof, is accurate with respect to the rollers 61 of the conveyor 6. In FIGS. 1 and 4, the first lift 7 has been operated to raise the first container 2 into a raised position in which one of the shelves 22 is level with the rollers 61 of the conveyor 6. Hence, the first container 2 is now ready to be emptied in a second step of the method.

FIGS. 14 and 5 show the picking-up and taking out of first tire components 91 from the first container 2 during the second step of the method.

In particular, FIGS. 1 and 4 show how the take-out member 6 has been moved in the lateral direction L into a pick-up position underneath one of the first tire components 91 that is closest to the take-out member 6. At this point, the first lift 7 may be operated to lower the first container 2 slightly with respect to the take-out member 6, such that the rollers 61 of the conveyor 60 extend slightly above the shelf 22. The rollers 61 thus lift the closest first tire component 91 slightly above and/or clear of the bars 21 that form the shelf 22. Now that the rollers 61 support the closest first tire component 91, the take-out member 6 may be moved slightly in the lateral direction L to align the closest first tire component 91 with the servicer 4. In this exemplary embodiment, the closest first tire component 91 is already aligned with the servicer 4 and may be transferred directly onto said servicer 4. Subsequently, the rollers 61 are driven to convey the closest first tire component 91 out of the first container 2 in the first take-out direction T1 and onto the servicer 4 in the discharge direction D.

FIG. 5 shows the situation in which the previously discussed one first tire component 91 has been taken-out of the first container 2 and two first tire components 91 remain on the shelf 22. The take-out member 6 has been moved in the lateral direction L into a pick-up position underneath the next closest first tire component 91 of the first tire components 91 supported on the shelf 22. The first lift 7 may again be operated to initially raise the first container 2 as the take-out member 6 is moved underneath the next first tire component 91 and subsequently lower the first container 2 again so that the rollers 61 lift the next first tire component 91 from the shelf 22. Once lifted, the take-out member 6 is moved in the lateral direction L to align the next first tire component 91 with the servicer 4 in the discharge direction D. Hence, the next first tire component 91 is moved into the position of the previously taken-out first tire component 91. Subsequently, the rollers 61 are driven to convey the next first tire component 91 out of the first container 2 in the first take-out direction T1 and onto the servicer 4 in the discharge direction D.

FIG. 6 shows the situation in which the last of the first tire components 91 supported on the shelf 22 is picked-up, aligned in the lateral direction L with the servicer 4 and taken-out of the first container 2 in the first take-out direction T1 onto the servicer 4 in the same manner as the previously taken-out first tire components 91.

The aforementioned process may be repeated for each shelf 22 of the first container 2 until the first container 2 is completely empty. Preferably, the shelves 22 are emptied from the bottom or lower shelf 22 towards the top shelf 21 so that the first container 2 is progressively lowered as the take-out member 6 empties an increasingly higher shelf 22.

FIGS. 2 and 7 show the picking-up and taking out of second tire components 92 from the second container 3 during a third step of the method. The first container 2 is lowered into the first exchange position below the take-out member 6 such that the take-out member 6 can reach through the first station S1 and/or over the first container 2 in the first exchange position up to the second station 3. Meanwhile, the emptied first container 2 is exchanged for a 'new' full first container 2. As shown in FIGS. 2 and 7, the take-out member 6 is moved in the lateral direction L into a pick-up position underneath the closest of the second tire components 92 on the shelf 32 of the second container 3. The second lift 8 may be operated like the first lift 7 to initially raise the second container 3 as the take-out member 6 is moved underneath the closest second tire component 92 and subsequently lower the second container 3 again so that the rollers 61 lift the closest second tire component 92 from the shelf 32. Once lifted, the rollers 61 are driven in an opposite direction as opposed to FIGS. 1 and 4-6 to take-out the closest second tire component 92 in the second take-out direction T2 opposite to the first take-out direction T1.

FIG. 7 show the situation in which closest second tire component 92 has been conveyed in the second take-out direction T2 into a take-out position on the conveyor 60 completely outside the second container 3. As shown in FIG. 7, the take-out member 6 is subsequently moved in the lateral direction L to align the taken-out second tire component 92 with the servicer 4 in the discharge direction D. However, after alignment, the taken-out second tire component 92 is still on the opposite side of the first station S1 with respect to the servicer 4. Hence, the rollers 61 of the conveyor 6 are operated to convey the taken-out second tire component 92 in the first take-out direction T1 and/or the discharge direction D through the first station S1 onto the servicer 4.

The process of FIGS. 7 and 8 is repeated for each of the second tire components 92 on the shelf 32 and may be repeated for each shelf 32 of the second container 3 until the second container 3 is emptied. At that point, the second container 3 may be lowered and the 'new' full first container 2 may be raised again for a next cycle of the method.

Optionally, the method may be automated to a large extent by providing a series of first sensors, e.g. photocells, arranged alongside each of the containers 2, 3 for detecting the presence or absence of tire components 91, 92 on each of the shelves 22, 32. The sensor data is stored in a controller, e.g. a PLC, that is operationally connected to the take-out member 6 so that the take-out member 6 may be automatically controlled towards the correct shelf 22, 32. The method may further be automated by providing a second sensor, e.g. a photocell, at a position downstream of the container 2, 3 in the respective take-out direction T1, T2, T102, T201, T301, T302 to detect if a tire component 91, 92 is actually taken-out.

Figure 9:
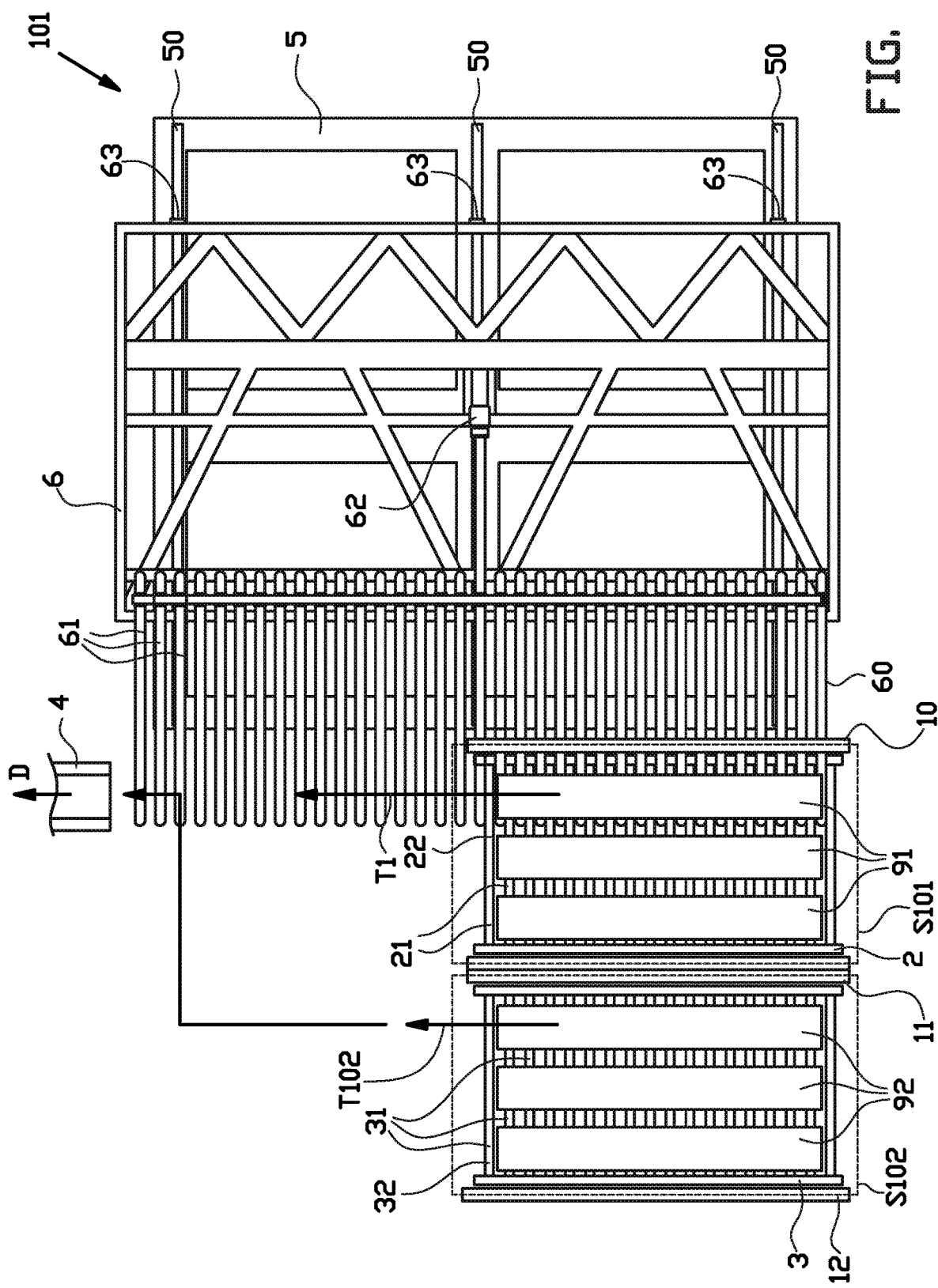

FIG. 9 shows an alternative transfer device 101 according to second embodiment of the invention that differs from the previously discussed transfer device 1 in that it has a first station S101 and a second station S102 which are spaced apart from the servicer 4 in the discharge direction D over a distance that allows for the first tire components 91 and the second tire components 92 to be picked-up and taken-out completely from the first container 2 at the first station S101 and the second container 3 at the second station S102, respectively, prior to the transfer to the servicer 4. Hence, in contrast to the previously discussed embodiment, the take-out member 6 of the alternative transfer device 101 is arranged for picking-up and taking-out the second tire components 92 in a second take-out direction T102 that corresponds to the first take-out direction T1 and/or the discharge direction D.

Again, a first group of the rollers 61 is arranged to be inserted between the bars 21, 31 of the containers 2, 3 while a second group of the rollers 61 extends alongside the first container 2 and the second container 3 at the second take-out direction T102. Hence, the rollers 61 can convey the tire components 91, 92 to a take-out position on the conveyor 60 completely outside of the first container 2 or the second container 3. The first tire components 91 can subsequently be discharged directly onto the servicer 4 in the discharge direction D while the second tire components 92 first have to be moved in the lateral direction L to align them with the servicer 4. Apart from the aforementioned differences, the alternative transfer device 101 functions in the same way as the previously discussed transfer device 1.

Figure 10:
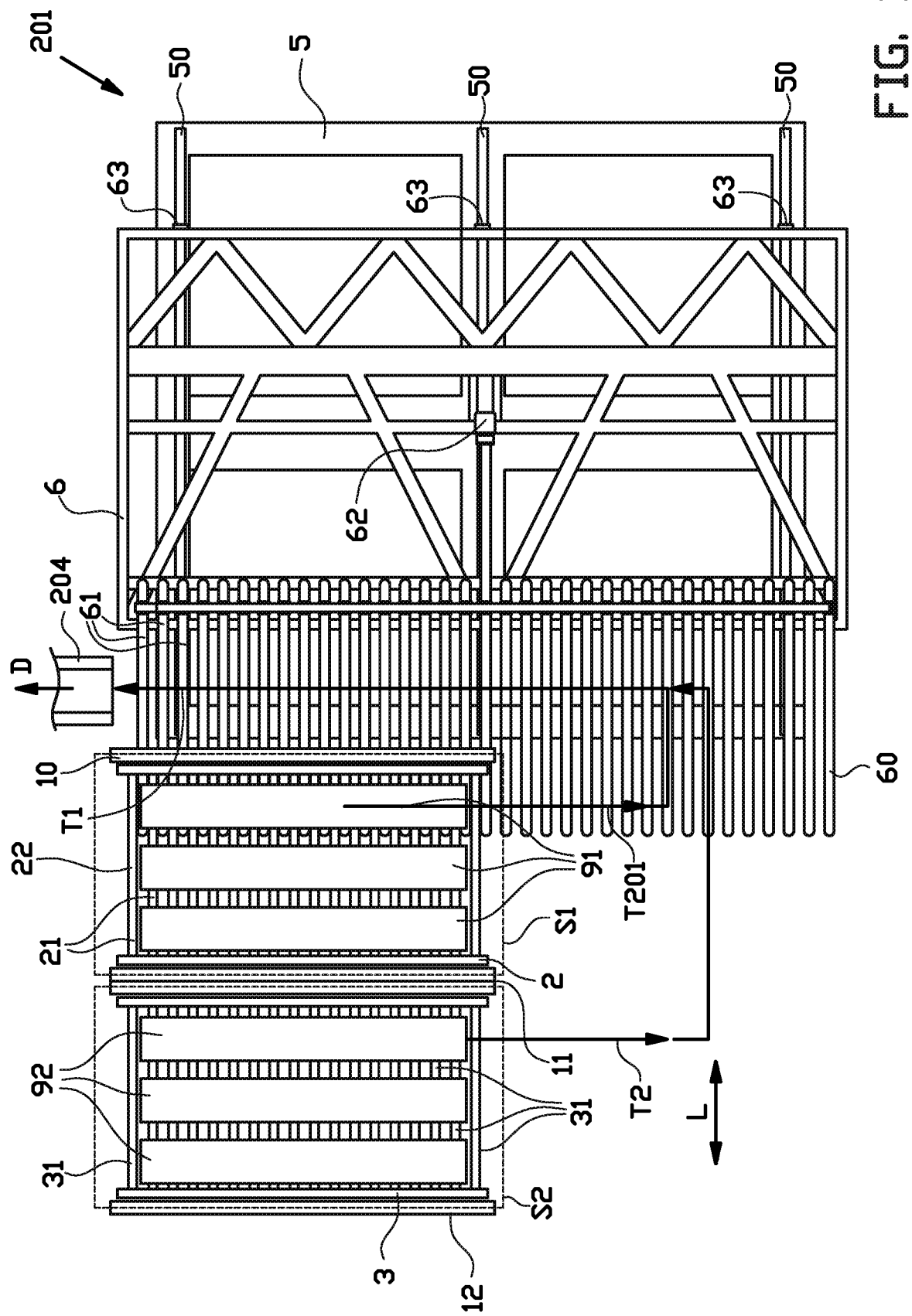

FIG. 10 shows an alternative transfer device 201 according to third embodiment of the invention that differs from the previously discussed transfer devices 1, 101 in that its servicer 204 is not aligned with any of the containers 2, 3. Instead, it is located in the lateral direction L at the position of the base 5 or at a position between the base 5 and the first container 2. Hence, the first tire components 91 and the second tire components 92 are both taken-out completely from their respective containers 2, 3 in a take-out direction T201, T2 facing away from the servicer 204 and subsequently brought in alignment with said servicer 204 in the lateral direction L before discharging the tire components 91, 92 in the discharge direction D towards the servicer 204.

Figure 11:
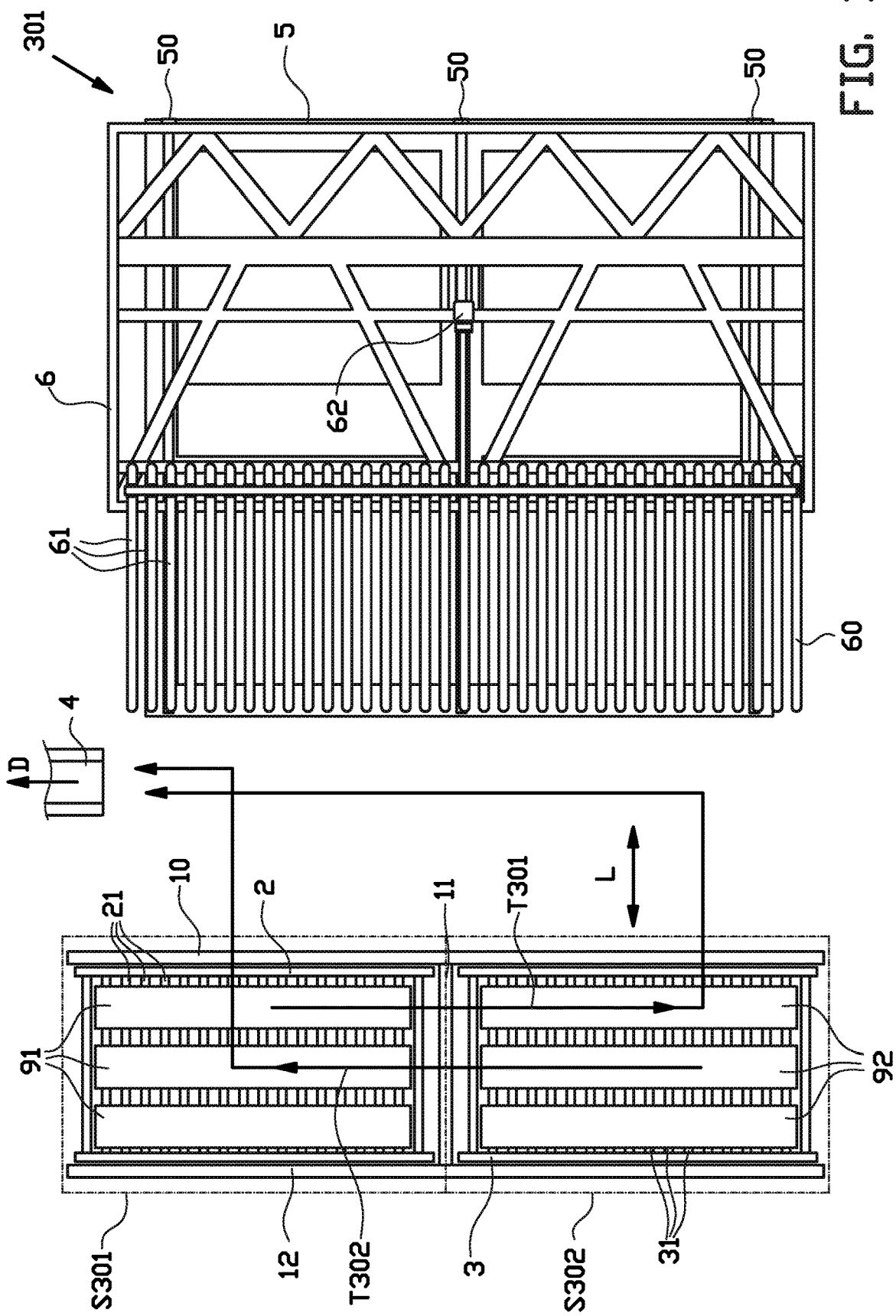

FIG. 11 shows an alternative transfer device 301 according to fourth embodiment of the invention that differs from the previously discussed transfer devices 1, 101, 201 in that its first station S301 and second station S302 are not placed side-by-side in the lateral direction L. Instead, the stations S301, S302 are placed front-to-end in a direction parallel to their respective take-out directions T301, T302. The stations S301, S302 are preferably placed out of line with the servicer 4 in the discharge direction D so that the containers 2, 3 can be exchanged easily without interference with or from the servicer 4.

The take-out member 6 is arranged for reaching into the first container 2 and for picking-up and taking-out one of the first tire components 91 in a first take-out direction T301 facing away from the servicer 4 into a take-out position above the second station S302. The taken-out one first tire component 91 is then aligned in the lateral direction L with the servicer 4 and subsequently discharged in the discharge direction D. Similarly, the take-out member 6 is arranged for reaching into the second container 3 and for picking-up and taking-out one of the second tire components 92 in a second take-out direction T302 facing towards the servicer 4 into a take-out position above the first station S301. The taken-out one second tire component is then aligned in the lateral direction L with the servicer 4 and subsequently discharged in the discharge direction D.

FIG. 12 shows an alternative transfer device 401 according to fifth embodiment of the invention that differs from the previously discussed transfer devices 1, 101, 201, 301 in that its stations S401, S402 are placed side-by-side in the lateral direction L while also being offset with respect to each other in a direction perpendicular to the lateral direction L. Although the method for picking-up and taking-out the second tire components 92 from the second container 3 substantially corresponds to the method as shown in FIGS. 7 and 8, the alternative configuration of the stations S401, S402 as shown has the additional advantage that the containers 2, 3 are easily accessible. The stations S401, S402 do not block each other in the lateral direction L.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A transfer device for transferring a plurality of first tire components from a first container and a plurality of second tire components from a second container to a servicer, wherein the transfer device comprises a first station and a second station for receiving the first container and the second container, respectively, wherein the first container and the second container are each provided with a plurality of mutually parallel, spaced apart bars extending in the lateral direction in a number of superimposed, mutually parallel planes to form a series of shelves for supporting the first tire components and the second tire components, respectively, wherein the transfer device further comprises a base and a take-out member that is mounted to said base and that is movable with respect to said base in a lateral direction towards the first station and the second station for picking-up and taking-out one of the first tire components from the first container at said first station and for picking-up and taking-out one of the second tire components from the second container at said second station, respectively, and wherein the first station and the second station are arranged at the same side of the base in the lateral direction, wherein the take-out member is arranged for transferring the first tire components and the second tire components to the servicer in a discharge direction transverse or perpendicular to said lateral direction, wherein the take-out member is arranged for picking-up and taking-out said one of the tire components from the first container and the second container in a first take-out direction and a second take-out direction, respectively, parallel to the discharge direction, wherein the take-out member comprises a conveyor for conveying the first tire components and the second tire components in the first take-out direction and the second take-out direction, and wherein the conveyor is a roller conveyor comprising a plurality of rollers extending in the lateral direction, wherein at least a first group of the rollers is arranged to be inserted between the plurality of bars of the first container or the second container for conveying the first tire components and the second tire components, respectively, over said plurality of bars in the first take-out direction and the second take-out direction.

2. The transfer device according to claim 1, wherein the first station and the second station are arranged side-by-side in the lateral direction.

3. The transfer device according to claim 2, wherein the base is located in the lateral direction at a side of the first station facing away from the second station, wherein the take-out member is arranged for reaching through the first station in the lateral direction up to the second station for picking-up and taking-out said one of the second tire components from the second container.

4. The transfer device according to claim 1, wherein the first station and the second station are provided with a first lift and a second lift, respectively, for raising or lowering the first container and the second container, respectively, with respect to the take-out member, wherein the first lift is arranged for lowering the first container into a first exchange position below the take-out member, wherein the take-out member is arranged for reaching over the first container in the first exchange position up to the second station for picking-up and taking-out said one of the second tire components from the second container.

5. The transfer device according to claim 4, wherein the take-out member is arranged to be spaced apart from the first container in the first exchange position when reaching over said first container.

6. The transfer device according to claim 1, wherein the first station is arranged to be in line with the servicer in said discharge direction, wherein the take-out member is arranged for picking-up and taking-out said one of the first tire components from the first container in the first take-out direction.

7. The transfer device according to claim 6, wherein the take-out member is arranged for picking-up and taking-out said one of the second tire components from the second container in the second take-out direction and for moving said one taken-out second tire component in the lateral direction into alignment with the servicer in the discharge direction for transferring said one taken-out second tire component to the servicer in said discharge direction.

8. The transfer device according to claim 7, wherein the take-out member is arranged for moving the one taken-out second tire component in the second take-out direction to a take-out position completely outside of the second container at the second station.

9. The transfer device according to claim 7, wherein the second take-out direction corresponds to the first take-out direction or the discharge direction.

10. The transfer device according to claim 1, wherein the first station and the second station are arranged out of line with the servicer in said discharge direction, wherein the take-out member is arranged for picking-up and taking-out said one of the tire components from the first container and the second container in the first take-out direction and the second take-out direction, respectively, and for moving said one taken-out tire component in the lateral direction into alignment with the servicer in the discharge direction for transferring said one taken-out tire component to the servicer in said discharge direction.

11. The transfer device according to claim 10, wherein the take-out member is arranged for picking-up and taking-out said one of the second tire components from the second container in the second take-out direction and for moving said one taken-out second tire component in the lateral direction into alignment with the servicer in the discharge direction for transferring said one taken-out second tire component to the servicer in said discharge direction.

12. The transfer device according to claim 10, wherein the take-out member is arranged for moving the one taken-out second tire component in the second take-out direction to a take-out position completely outside of the second container at the second station.

13. The transfer device according to claim 10, wherein the second take-out direction is opposite to the first take-out direction, wherein the take-out member is arranged for transferring said one taken-out second tire component in the discharge direction to the servicer through the first station.

14. The transfer device according to claim 10, wherein the second take-out direction corresponds to the first take-out direction or the discharge direction.

15. The transfer device according to claim 1, wherein the first container and the second container are each provided by upright or vertically extending columns, wherein the plurality of bars are supported in their respective planes by said columns.

16. The transfer device according to claim 1, wherein the shelves are fixed with respect to each other.

17. The transfer device according to claim 1, wherein at least some of the rollers are driven rollers.

18. The transfer device according to claim 1, wherein the take-out member comprises a lateral drive that is arranged for moving the conveyor in the lateral direction with respect to the base towards and away from the first station and the second station.

19. The transfer device according to claim 1, wherein a second group of the rollers is arranged to extend alongside the second container in the second take-out direction for conveying the one taken-out second tire component to a take-out position on the conveyor completely outside of the second container at the second station.

20. A method for transferring a plurality of first tire components from a first container and a plurality of second tire components from a second container to a servicer, using a transfer device which comprises a first station and a second station for receiving the first container and the second container, respectively, wherein the transfer device further comprises a base and a take-out member that is mounted to said base and that is movable with respect to said base in a lateral direction towards the first station and the second station for picking-up and taking-out one of the first tire components from the first container at said first station and for picking-up and taking-out one of the second tire components from the second container at said second station, respectively, and wherein the first station and the second station are arranged at the same side of the base in the lateral direction, wherein the method comprises the steps of:
  a) receiving the first container and the second container in the first station and the second station, respectively;
  b) moving the take-out member with respect to the base towards the first station for picking-up and taking-out one of the first tire components from the first container at said first station; and
  c) moving the take-out member with respect to the base towards the second station for picking-up and taking-out one of the second tire components from the second container at said second station.

21. The method according to claim 20, wherein the take-out member reaches through the first station in the lateral direction up to the second station in step c).

22. The method according to claim 20, wherein the method further comprises the step of:
  d) lowering the first container into a first exchange position below the take-out member prior to step c) such that the take-out member can reach over the first container in the first exchange position up to the second station.

23. The method according to claim 20, wherein the method further comprises the step of:
  e) transferring the first tire components and the second tire components to the servicer in the discharge direction.

24. The method according to claim 23 wherein the first station is arranged in line with the servicer in said discharge direction, wherein the take-out member in step b) picks-up and takes-out said one of the first tire components from the first container in the first take-out direction.

25. The method according to claim 23, wherein the first station and the second station are arranged out of line with the servicer in said discharge direction, wherein the take-out member in step b) picks-up and takes-out said one of the tire components from the first container and the second container in the first take-out direction and the second take-out direction, respectively, and moves said one taken-out tire component in the lateral direction into alignment with servicer in the discharge direction for transferring said one taken-out tire component to the servicer in said discharge direction.

26. The method according to claim 24, wherein step c) prior to step e) further comprises the steps of:
  c1) picking-up and taking-out said one of the second tire components from the second container in the second take-out direction; and
  c2) moving said one taken-out second tire component in the lateral direction into alignment with servicer in the discharge direction.

27. The method according to claim 25, wherein step c) prior to step e) further comprises the steps of:
  c1) picking-up and taking-out said one of the second tire components from the second container in the second take-out direction; and
  c2) moving said one taken-out second tire component in the lateral direction into alignment with servicer in the discharge direction.

28. The method according to claim 26, wherein the one taken-out second tire component in step c1) is moved in the second take-out direction to a take-out position completely outside of the second container at the second station.

29. The method according to claim 26, wherein the second take-out direction is opposite to the first take-out direction, wherein said one taken-out second tire component in step e) is transferred in the discharge direction to the servicer through the first station.

30. The method according to claim 26, wherein the second take-out direction corresponds to the first take-out direction or the discharge direction.

* * * * *